May 8, 1956 A. R. HOLGERSON 2,744,352
WATER KITE
Filed May 18, 1954
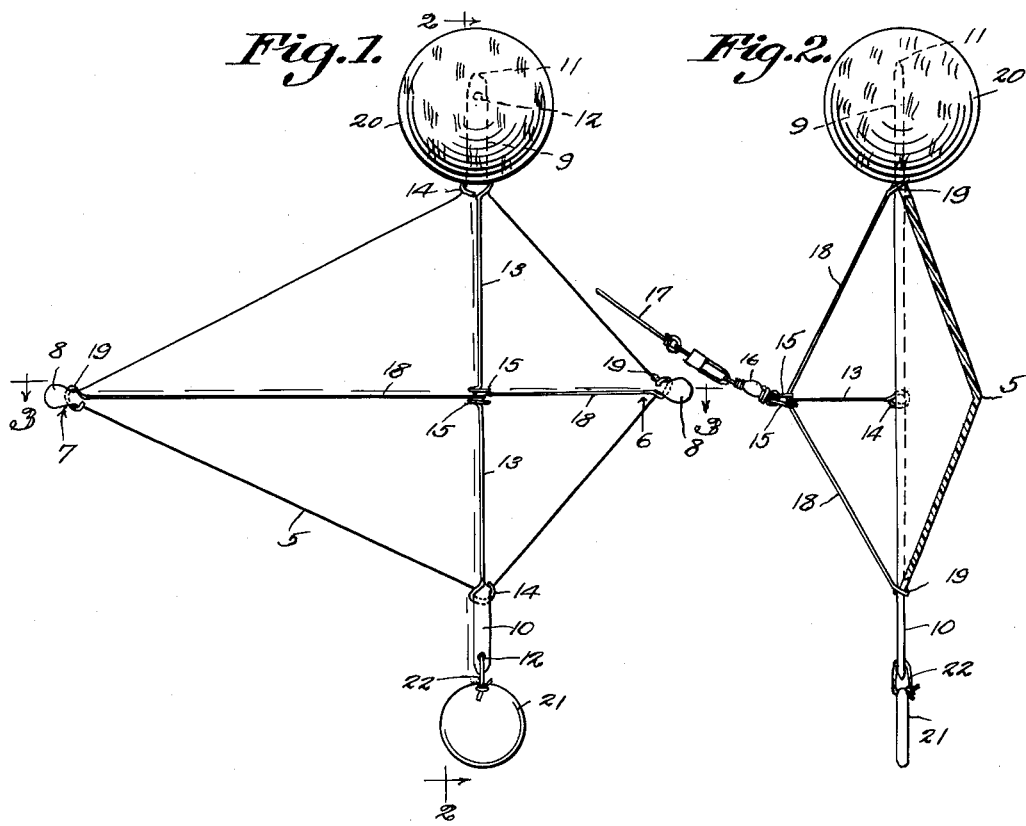
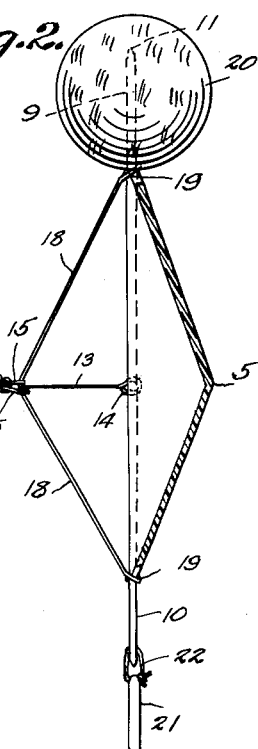
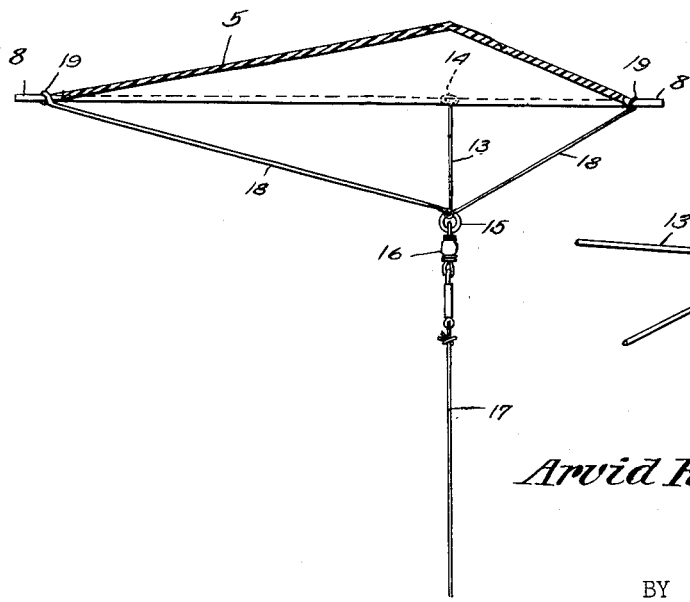
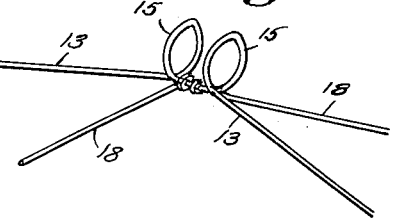
Arvid R. Holgerson
INVENTOR
BY *C. A. Snow & Co.*
ATTORNEYS.

United States Patent Office 2,744,352
Patented May 8, 1956

2,744,352

WATER KITE

Arvid R. Holgerson, Sacramento, Calif.

Application May 18, 1954, Serial No. 430,583

5 Claims. (Cl. 43—43.13)

This invention relates to fishing tackle, and more specifically to devices commonly known as fishing kites used by fishermen to cause the fishing line and baited hook to be floated out into the stream, eliminating the necessity of repeatedly casting in order to properly locate the baited hook connected therewith, for fishing.

An important object of the invention is to construct the fishing kite which is preferably constructed of plastic material and so designed that the float and sinker which are carried by the kite, may be readily and easily reversed, adapting the kite for use in fishing from either bank of a stream.

Another object of the invention is to provide a kite wherein the bridle may be readily and easily fastened on the body of the kite, the kite being so constructed that the bridle may be adjusted to change the angle to which the kite may be carried into the stream.

With the foregoing and other objects in view which will appear as the description proceeds, the invention consists of certain novel details of construction and combinations of parts hereinafter more fully described and pointed out in the claims, it being understood that changes may be made in the construction and arrangement of parts without departing from the spirit of the invention as claimed.

Referring to the drawing:

Figure 1 is an elevational view of a fishing kite constructed in accordance with the invention, illustrating the position of the kite within a body of water.

Fig. 2 is a partial sectional view taken on line 2—2 of Fig. 1.

Fig. 3 is a sectional view taken on line 3—3 of Fig. 1.

Fig. 4 is an enlarged perspective view illustrating the connected ends of the longitudinal and transverse lines forming the bridle of the kite.

Referring to the drawing in detail, the body of the kite is indicated generally by the reference character 5 and is constructed of sheet material, preferably plastic, the body being constructed to provide tapered lead and trailing ends 6 and 7, respectively, the body being wide at a point intermediate its ends.

Enlargements 8 circular in plan are formed at the tapered ends 6 and 7 and afford means for attaching the ends of the bridle strings to the body of the kite, in a manner hereinafter to be more fully described.

Extending from the side edges of the body of the kite and disposed at the wide portion of the kite, are arms 9 and 10, respectively, the arms 9 and 10 being pointed at 11 and provided with openings 12 adjacent to the pointed ends.

The bridle comprises a line 13 which is disposed along the transverse axis of the kite or body 5, the ends of the line being formed into loops 14 that are looped around the arms 9 and 10. Intermediate the ends of the line 13 are loops 15 which are spaced apart, the loops 15 providing means for attaching the conventional swivel connection indicated at 16 to the body 5, the swivel connection being secured to the end of the fishing line 17 which is attached to the conventional fishing pole in the usual way.

The bridle also includes the longitudinally disposed line 18 which has loops 19 formed at its ends, the loops 19 being secured around the inner ends of the enlargements 8 and 10. The intermediate portion of the line 18 is coiled around a portion of the bridle line 13, at a point between the loops 15 thereof, thereby firmly securing the line 18 to the line 13.

It might be further stated that these lines 13 and 18 are formed preferably of lengths of wire which have their ends bent around the enlargements and arms extended from the corners of the body portion of the kite.

The reference character 20 indicates a float having a central opening in which the arm 9 or 10 may be extended to secure the float to the kite. When the float has been secured to an arm 9 or 10, the opposite arm provides the support for a weight, which in the present showing is indicated by the reference character 21, the weight being secured by passing the attaching cord 22 secured to the weight through the opening of the arm in a manner as shown by Fig. 1 of the darwing.

In the formation of the body 5, the body is formed to provide a concavo-convex structure, to the end that water contacting the concaved surface of the body will tend to hold the body in an upright position at all times.

The snelled hooks or hook may be positioned along the line 17 at the desired position, to meet requirements of use.

From the foregoing it will be seen that the float and weight may be reversed, so that the device may be used by a fisherman fishing on either bank of a stream.

It will be seen that due to the construction of the fishing kite, the kite may be dropped into the water at the edge of a stream and be carried to the center of the stream by the water currents, where the fish hooks will be maintained in a proper position for the best fishing results.

Having thus described the invention, what is claimed is:

1. A fishing kite comprising a body constructed of semi-rigid sheet material wide at a point intermediate its ends with circular tips forming the front and rear ends thereof, arms formed integral with said body extending laterally from the side edges thereof at the wide portion of said body, a weight secured to one of said arms, a float secured to the other arm adapted to hold the kite vertically within a body of water, and a fishing line bridle secured to the body.

2. A fishing kite comprising a body constructed of semi-rigid material, wide at a point intermediate its ends, arms formed integral with said body, extending laterally from the side edges thereof adjacent to the wide portion of said body, a weight removably secured to one of said arms, a float removably secured to the other arm, a bridle comprising a center line extending along the longitudinal axis of said body, a second line crossing and secured to said center line, and said second line having loops providing a line bridle.

3. A fishing kite comprising a concavo-convex body, constructed of semi-rigid sheet material wide at a point intermediate the ends thereof, arms extending laterally from opposite side edges of said body at the wide portion thereof, a float removably secured to one of said arms, a weight secured to the other arm adapted to hold said body in a vertical floating position, enlargements formed at the front and rear ends of the body, and a fishing line bridle secured to said enlargements and overlying the concave side of the body.

4. A fishing kite, comprising a concavo-convex body constructed of semi-rigid sheet material, wide at a point intermediate the ends thereof, arms extending laterally from opposite side edges of the body at the wide portion thereof, a float removably secured to one of said arms, a weight removably secured to the other arm adapted to float said body in a vertical floating position, enlargements formed at the front and rear ends of the body, a bridle embodying a transverse line having its ends secured to said arms, and a second line extending along the longitudinal axis of said body and secured to the transverse line, the ends of the second line being looped around said enlargements.

5. A fishing kite, comprising a concavo-convex body constructed of semi-rigid sheet material wide at a point intermediate the ends thereof, means for removably securing a float to one of the side edges of said body, means for removably attaching a weight to the other side edge of said body, a weight removably secured to the last mentioned means, a bridle embodying lines secured longitudinally and transversely of said body, said lines crossing each other at a point in a line with the longitudinal axis of the body, and fishing line loops forming a part of said bridle.

References Cited in the file of this patent

UNITED STATES PATENTS

| | | |
|---|---|---|
| 780,029 | Flegle | Jan. 17, 1905 |
| 1,449,910 | Oertz | Mar. 27, 1923 |
| 2,535,211 | Jelinek | Dec. 26, 1950 |